UNITED STATES PATENT OFFICE.

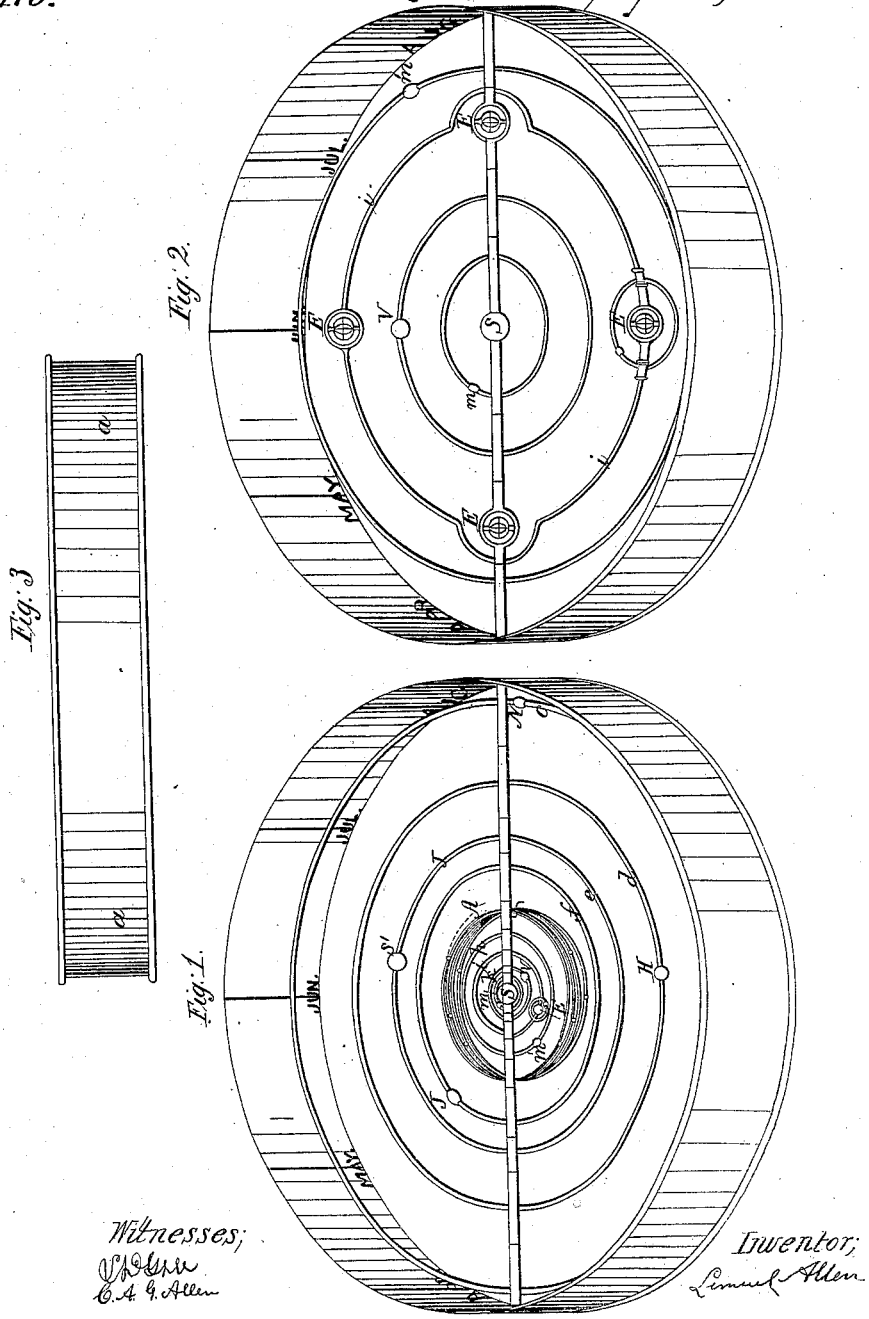

LEMUEL ALLEN, OF PEKIN, ILLINOIS.

PLANETARIUM.

Specification of Letters Patent No. 25,476, dated September 20, 1859.

*To all whom it may concern:*

Be it known that I, LEMUEL ALLEN, of the town of Pekin, county of Tazewell, and State of Illinois, have invented a new and improved Method of Constructing a Planetarium; and I do hereby declare the following to be a full and exact description thereof, reference being had to the accompanying drawings and references marked thereon, making a part of the specification.

The invention consists in constructing a planetarium as a piece of common school apparatus to be used as a hand implement constructed and used in the manner hereinafter described.

The apparatus consists of a series of wire rings representing the orbits of the several planets, the sun being the common center and the several planets arranged around it according to their several distances from the sun.

To retain the orbits of the several planets at their proper distances apart, a diametric rod passes through the wires representing the several orbits of the planets and terminates at each extremity in a broad hoop of metal or wood which represents the zodiac, and on the inside of which is painted the twelve signs of the zodiac representing or corresponding with the twelve months of the year.

There is also shown in this apparatus a representation of the earth in the four different parts of her orbit for explaining the different lengths of the days and nights and the variations of the seasons.

All the primary and the secondary planets are capable of being shown by this apparatus. I have, however, only represented the primary ones except our own moon which may stand as the representation of the rest.

The apparatus is at once, light, (not exceeding a pound's weight) cheap, strong and simple, compact and portable. If deranged, it is easily repaired.

In the accompanying drawings and references—Figure 1 represents a front elevation, partly in perspective, Fig. 2 an edge view, Fig. 3 view of the earth in different parts of its orbit.

Letters ($a, a$) represent the hoop or belt of the planetarium, ($b$) the diametric rod on which the orbits of the planets are suspended and may be moved so as to form different angles with the plane of the ecliptic.

($c$) represents the orbit of Neptune, ($d$) that of Herschel, ($e$) the orbit of Saturn, ($f$) orbit of Jupiter, ($g$) orbits of the four asteroids, ($h$) orbit of Mars, ($i$) orbit of the earth, ($k$) orbit of Venus, ($m$) orbit of Mercury, ($n$) orbit of the moon.

S represents the sun, M, Mercury, V Venus, E the earth.

A, represents the asteroids, J, represents Jupiter, S' represents Saturn, N represents Neptune, H represents Herschel.

The rod ($b$) consists of an internal smaller wire not represented in the drawings, and a hollow wire or tube over it, cut into twice as many sections, $x$, as there are primary planets; one series of nine sections being on each half of the rod ($b$). Of these sections each is soldered fast to the wire representing the orbit of the planet with which it is connected; the orbit being moved or turned on its sections as on a hinge, to take its proper obliquity to the plane of the ecliptic. Each of the orbits has its own independent motion on its section.

Fig. 3 represents a view of the earth shown in four different, equidistant parts of its orbit, by which the different variations of the seasons may be illustrated, the lengths of days and nights, eclipses of the sun and moon, and of the other primary and secondary planets. In this figure the axis of the earth is fixed with regard to its orbit, being inclined thereto at a certain angle and is parallel to itself in every part of its orbit. The axis of the earth, therefore, makes the same angle with the plane of the ecliptic in whatever part of its orbit it may chance to be.

It is not deemed necessary in this description to enter into details of illustration of which this apparatus is capable, as that is obvious from inspection. The 12 signs of the zodiac and the corresponding months of the year being all found in place on the inner surface of the hoop, or zodiac, are sufficiently explanatory of the scope and capability of the machine in the hands of a skilful teacher.

While Fig. 1 represents all the primary planets in their order of revolution around the sun, Fig. 2 represents only two inferior and one superior planet, in order more effectually to show the position of the earth relatively to the sun, and the other planets.

The diametric rod ($b$) represents the diameter of the solar system, one terminus pointing toward the vernal equinox (in March) and corresponding with the beginning of Aries, the other pointing toward the autumnal equinox (in September), and corresponding with the beginning of Libra. This diametric rod also represents at its extremities the two points in the heavens where the orbit of our planets crosses the equator of the heavens, or it is the intersection of the plane of the equator and ecliptic.

Having now described the nature of the invention and its application to use

What I claim as my invention in the construction of planetariums is—

1. The representation of the planets and their orbits suspended on a diametric rod and capable of rotating on said rod within a broad belt which represents the zodiac, substantially as set forth.

2. I also claim the arrangement of devices by which the earth may be adjusted to represent its relative position to the sun and to the plane of its orbit at any point thereof in the manner and for the purpose set forth.

LEMUEL ALLEN.

Witnesses:
S. D. GALE,
C. G. ALLEN.